OR 3,622,221

T3058D

United States Patent

[11] 3,622,221

| [72] | Inventors | Piscataway;<br>Leif Rongved, Summit; John W. Stafford, East Orange; John W. West, Millington, all of N.J. |
|---|---|---|
| [21] | Appl. No. | 830,393 |
| [22] | Filed | June 4, 1969 |
| [45] | Patented | Nov. 23, 1971 |
| [73] | Assignee | Bell Telephone Laboratories, Incorporated Murray Hill, Berkeley Heights, N.J. |

[54] SPRING STRUCTURE FOR PRODUCING SMALL DISPLACEMENTS
4 Claims, 5 Drawing Figs.

[52] U.S. Cl. .................................................... 350/6
[51] Int. Cl. .................................................... G02b 17/00
[50] Field of Search.......................................... 350/6, 7,
299, 310, 28; 248/350, 9, 358, 483, 487; 178/7.6;
74/5.5; 267/137

References Cited
UNITED STATES PATENTS

| 2,711,297 | 6/1955 | Thiele ........................ | 248/358 |
| 3,079,803 | 3/1963 | Moller ........................ | 74/5.5 |
| 3,113,755 | 12/1963 | Stevens et al. ................. | 248/358 |
| 3,476,349 | 11/1969 | Smith ......................... | 248/476 |
| 3,478,608 | 11/1969 | Met............................ | 350/310 X |

Primary Examiner—David Schonberg
Assistant Examiner—Michael J. Tokar
Attorneys—R. J. Guenther and Arthur J. Torsiglieri ABSTRACT: The polygonal mirror of a light beam scanner is aligned on a shaft by three mounting fixtures, each comprising a stiff spring bearing against one side of the mirror and a relatively soft spring bearing against the opposite side. The soft spring is compressed against the mirror by a bolt. The rotational plane of the mirror is adjusted by threading the bolts toward or away from the mirror.

INVENTORS
G. J. W. KOSSYK
L. RONGVED
J. W. STAFFORD
J. W. WEST

BY
R B Anderson
ATTORNEY

SPRING STRUCTURE FOR PRODUCING SMALL DISPLACEMENTS

BACKGROUND OF THE INVENTION

This invention relates to apparatus for producing small displacements, and more particularly, to apparatus for aligning a rotational member on a central axis.

The copending application of D. R. Herriott—K. M. Poole—A. Zacharias, Ser. No. 796,456, filed Feb. 4, 1969, and assigned to Bell Telephone Laboratories, Incorporated, describes light beam scanning apparatus employing a rotating polygonal mirror for reflecting a laser beam to cause it to scan a flat photosensitive medium. Even though the mirror is driven by an electrical motor, a relatively gross device, the application shows how, by proper light beam coding, highly precise photographic reproduction can be obtained. A cursory examination of the apparatus demonstrates the desirability of accurately mounting the polygonal mirror on the central rotating shaft so that the mirror structure is precisely perpendicular to the axis of the rotation; otherwise, there is a certain amount of "wobble" as the mirror rotates, and the accuracy of light beam scanning is impaired.

SUMMARY OF THE INVENTION

It is an object of this invention to provide a mechanical deamplifier which permits a relatively large manually applied displacement to be translated to a very small displacement precisely related to the large one.

It is a specific object of this invention to provide apparatus for accurately aligning a polygonal mirror with respect to a central axis of rotation.

These and other objects of the invention are attained in an illustrative embodiment thereof comprising a rotatable polygonal mirror held in place by three mounting fixtures each comprising a stiff spring bearing against one side of the mirror and a soft spring bearing against the opposite side. The soft spring is compressed against the mirror by a bolt. When the bolt is threaded toward the mirror, it compresses the soft spring against the spring bias to reduce the spring length by an amount $\delta_1$. This in turn deflects the mirror by an amount $\delta_2$ which is much smaller than $\delta_1$, because the stiff spring has a much larger spring constant than the soft spring.

The friction due to the compression of the polygonal mirror between the two springs of each mounting fixture holds the mirror in place and displaces it slightly from the central rotation axle. Thus, when one of the springs is compressed, the mirror is free to rotate about an axis defined by the other two mounting fixtures. Because each displacement can be made with such high precision the mirror can be aligned with respect to the central axis to less than ±0.5 second with negligible drift during use. It can be shown that, in both theory and in practice, alignment by the spring structures described can be made to smaller tolerances and with more reliability than previous techniques such as those that use solely the mechanical leverage of screw threads for giving mechanical deamplification.

These and other objects, features, and advantages of the invention will be better understood from a consideration of the following detailed description taken in conjunction wit the accompanying drawing.

DRAWING DESCRIPTION

DETAILED DESCRIPTION

Figure 1:
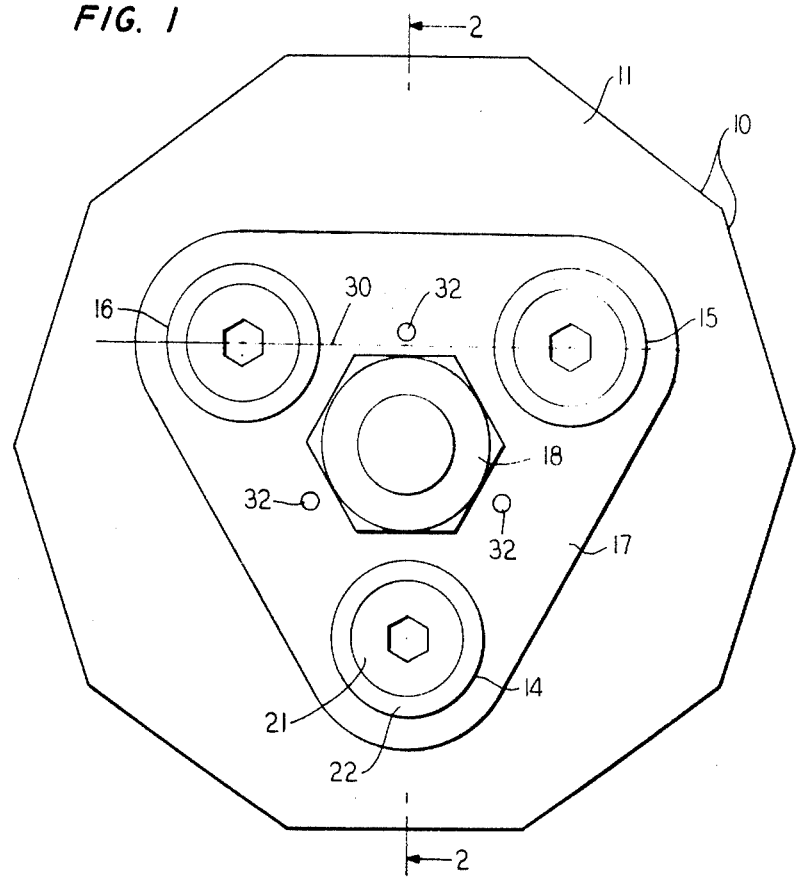
FIG. 1 is a front view of a polygonal mirror and associated mounting apparatus.
Figure 2:
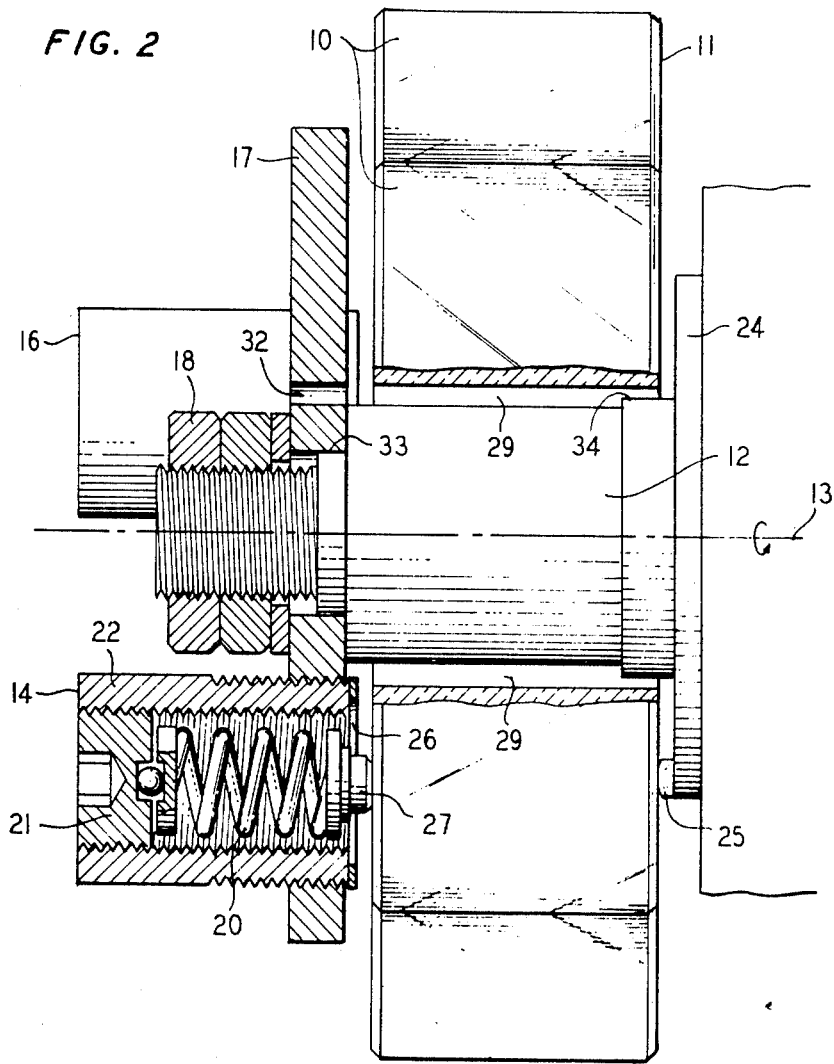
FIG. 2 is a side view, partly in section, of the mirror and apparatus of FIG. 1.

Referring now to FIGS. 1 and 2, there is shown a polygonal mirror 11 including on its periphery a plurality of mirror facets 10 used successively to reflect a concentrated light beam, usually a laser beam. The mirror is mounted on an axle 12 which is driven by an electrical motor to rotate about a central axis 13. As the mirror rotates, successive mirror facets 10 intercept a stationary light beam and, because the angle of reflection from the mirror facets continuously changes, the reflected light beam is caused to scan a photosensitive medium, which may be moved either continuously or abruptly between each scan. Three mounting fixtures 14, 15, and 16, located at 120° intervals, are mounted on a support plate 17, which in turn is mounted on the axle 12 by a nut 18.

Referring to FIG. 2, each mounting fixture comprises a coil spring 20 biased against compression and a bolt 21 threaded to a sleeve 22 rigidly mounted on the support plate 17. A flange 24 of the axle 12 includes three projections or pads 25, each located on a central axis of a corresponding coil spring 20—(only one of the three pads 25 is shown in FIG. 2). The coil spring 20 is stabilized by a diaphragm 26, and a spring head 27 bears directly on the polygonal mirror opposite a corresponding projection 25.

The polygonal mirror includes a central aperture which is somewhat larger than the outer periphery of that part of axle 12 extending through the aperture. The mirror is mounted or held in place solely by the friction between it and the three spring heads 27 and the three projections 25. The mirror is mounted symmetrically with respect to axis 13 to form a continuous annular gap 29 between the mirror and the axle.

Each projection 25 indenting into the mirror constitutes a spring which is extremely stiff by comparison to the coil spring 20. Hence, compression of a coil spring 20 gives a minutely small deflection of the mirror opposite projection 25. Deflection of the mirror by adjustment of one of the mounting fixtures causes the mirror to rotate on the axis defined by the other two fixtures. For example, if the spring head 27 of mounting fixture 14 produces an additional force on the mirror, the mirror is caused to rotate slightly on an axis 30 of FIG. 1 between fixtures 16 and 15. Minutely small alignment adjustments relative to the axis of axle 12 maybe made in this manner by threading bolt 21 a relatively large amount.

Figure 3A:
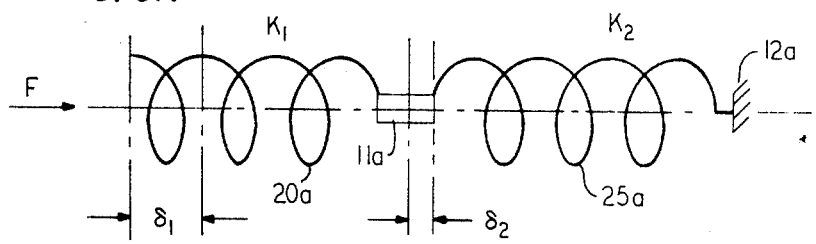
FIG. 3a is a schematic view of a spring structure illustrating the principles of the invention.

The foregoing embodiment illustrates how to adjust a mirror axis relative to an axle of an air bearing. The mechanical deamplification principle inherent in that adjustment is illustrated in FIG. 3a, where spring 20a corresponds in function to spring 20 of FIG. 2, spring 25a corresponds to projection 25, member 11a corresponds to mirror 11, and the support 12a corresponds to the axle 12. Assume that an axial force F against the bias of both springs is applied as shown such as to move the free end of spring 20a a distance $\delta_1$ relative to support 12a. It can be shown that the member 11a coupling the two springs is then moved relative to the support a distance $\delta_2$ given by the equation $$\delta_2 = \frac{K_1}{K_1 + K_2} \delta_1 \qquad (1)$$

where $K_1$ is the spring constant of spring 20a and $K_2$ is the spring constant of spring 25a. It can be appreciated that if $K_2$ is many orders of magnitude larger than $K_1$, then $\delta_2$ is many order of magnitude smaller than $\delta_1$.

One can see intuitively from FIG. 3a that if there is not substantial friction in the axial direction, that is, in the direction of F, $\delta_2$ will constantly and smoothly change as $\delta_1$ changes. This is important because smooth deamplification in conventional mechanical deamplifiers requires that critical components such as screw threads or gears must be machined with high precision and be kept free of dirt and other impurities. A related consideration is that of mechanical hysteresis. If member 11a is spuriously deflected, it will soon return to its precise equilibrium position; that is, there will be little or no hysteresis.

Since the mirror of FIG. 2 is held solely by the friction of spring heads 27 and projections 25, there is substantially no axial friction during the adjustment process. Thus, as bolt 21 is being threaded to compress spring 20, the mirror 11 is being pivoted minutely but still continuously. In structures that have been built, the coil spring 20 has a spring constant of 570 pounds per inch. The support plate 17 is a three-eighths inch thick steel circular plate which has been found to constitute a mechanically rigid coupling between mounting fixtures and the axle 12. The projections 25 are each a square whose area is .0625 in.² and whose height above the flange 24 is .010 in. and, like the axle 12 and flange 24, is made of steel. Each projection will elastically indent the mirror 11. The region of indentation is localized under each projection 25. These locally deformed regions constitute the spring constant $K_2$ which is many orders of magnitude greater than the spring constant $K_1$ of the corresponding spring 20. The mounting apparatus is designed such that each mounting fixture exerts 57 pounds of force on the mirror and an additional 60 pounds of force is attainable by threading the bolts 21. The mirror 11 is made of quartz and has been found to be readily supportable by these compressive forces without being susceptible to cracking. As was mentioned before, this structure permits alignment of the polygonal mirror to within ±0.5 second, which corresponds to ±3 millionths of an inch.

Figure 3B:
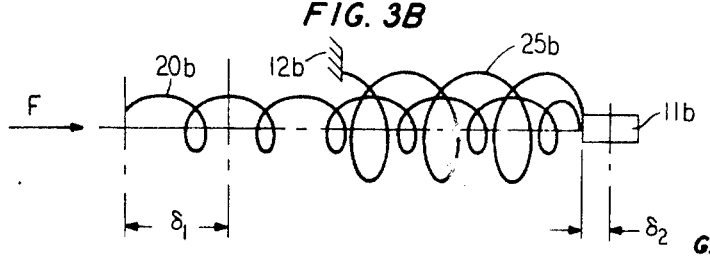
FIG. 3b is a schematic view of a spring structure in accordance with another embodiment of the invention.

FIG. 3b shows an alternative form in which spring 25b is designed to take tension rather than compression. Mechanical deamplification occurs according to equation (1) where $K_1$ is the spring constant of spring 20b and $K_2$ is the spring constant of spring 25b. As spring 20b is compressed, spring 25b is tensed, rather than compressed as in FIG. 3a.

Figure 4:
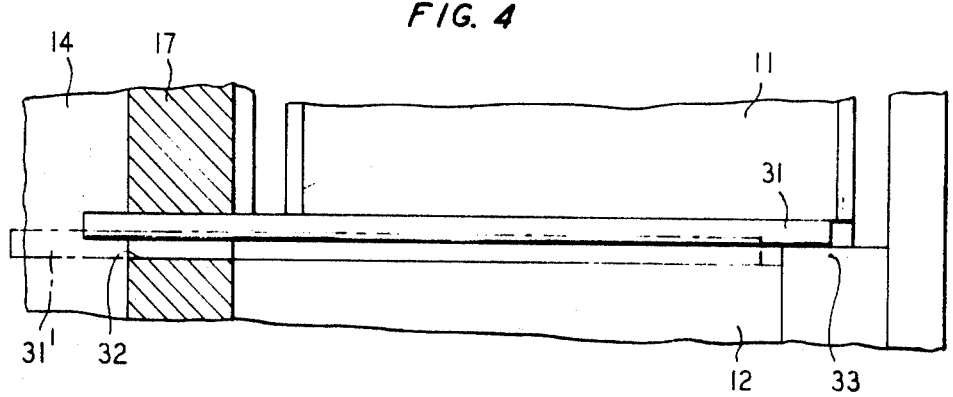
FIG. 4 is a partly sectional view of part of the mirror and mounting apparatus of FIG. 2 illustrating temporary support of the mirror.

The structure of FIGS. 1 and 2 is assembled by first displacing the mirror 11 from the axle 12 by three pins 31, one of which is shown in FIG. 4. The support plate 17 is then mounted on a step 33 of the axle 12 shown in FIG. 2, which is machined such that when nut 18 is tightened on the axle, the mounting fixtures apply sufficient force on the mirror to support it. The pins 31 are then withdrawn through apertures 32 in the support plate as shown in FIG. 4. Before withdrawal, the pins are advantageously supported on a step 34 of the axle 12 so that, during withdrawal, they need to be pulled against compressive friction over only a short distance; when the pin is in the dotted position 31', it is axially withdrawn with little friction.

The apparatus specifically shown and described is intended to be only illustrative of the principles involved. Various other embodiments and modifications may be made by those skilled in the art without departing from the spirit and scope of the invention.

What is claimed is:

1. A precisely adjustable mirror mount assembly comprising:

a first member having a central aperture and first and second opposite walls;

the second member extending through the aperture;

said second member comprising a wall portion partially coextensive with the second wall of the first member;

means for aligning the first member with respect to the second member comprising a plurality of mounting fixtures;

each mounting fixture comprising a spring and a bolt for axially compressing the spring against the first wall of the first member;

projections from the wall portions of the second member, each contacting the second wall of the first member at a point substantially on the axis of a spring, whereby the first member is compressed between corresponding springs and projections;

each bolt being threaded to a threaded member rigidly coupled to the second member;

the axial resiliency of the projections being much smaller than the axial resiliency of the springs, whereby a relatively large displacement of the spring gives a small displacement of the first member.

2. The combination of claim 1 wherein:

the aligning means comprises first, second, and third mounting fixtures, whereby adjustment of the first mounting fixture causes the first member to rotate on an axis defined by the second and third fixtures.

3. The combination of claim 1 wherein:

the aperture and the second member are cylindrical, the aperture having a larger diameter than that of the second member;

means for temporarily displacing the first member from the second member comprising a plurality of pins adapted to be inserted in the aperture between the first and second members;

the mounting fixtures being adapted to provide sufficient friction to support independently the first member;

the pins being adapted to be removed after the mounting fixtures have provided sufficient friction to support the first member.

4. Apparatus for producing with precision a small displacement of a mirror member relative to a support comprising:

three pairs of springs;

each pair of springs being displaced from the other pairs and each including a first spring having one end bearing against one side of the mirror member and a second spring coaxial with the first spring having one end bearing against the side of the mirror member diametrically opposite the first spring and having another end bearing against the support;

said first and second springs being designed to provide a spring bias against compression;

said first and second springs and the mirror member being free to move axially substantially without friction;

the second spring having a substantially larger spring constant $K_2$ than the spring constant $K_1$ of the first spring; and three members in engagement with the support, each of said members being capable of axially moving an end of one of said first springs toward the mirror member by an amount $\delta_1$ relative to the support to compress said first and second springs, thereby to displace the mirror member by an amount $\delta_2$ relative to the support, where $\delta_2$ is substantially given by $$\delta_2 = \frac{K_1}{K_1 + K_2} \delta_2$$

* * * * *

UNITED STATES PATENT OFFICE
CERTIFICATE OF CORRECTION

Patent No. 3,622,221                    Dated November 23, 1971

Inventor(s) Gunter J. W. Kossyk, Leif Rongved, John W. Stafford, John W. West

It is certified that error appears in the above-identified patent and that said Letters Patent are hereby corrected as shown below:

Col. 1, line 61, change "wit" to --with--.

Col. 2, line 33, change "spring" second occurrence, to --springs--;

line 42, change "maybe" to --may be--;

line 58, in the equation change "$\delta_2$" second occurrence, to --$\delta_1$--;

line 65, change "not" to --no--.

Col. 4, line 56, change "$\delta_2$" second occurrence, to --$\delta_1$--.

Signed and sealed this 30th day of May 1972.

(SEAL)
Attest:

EDWARD M. FLETCHER, JR.
Attesting Officer

ROBERT GOTTSCHALK
Commissioner of Patents